(12) United States Patent
Yamada

(10) Patent No.: US 6,791,762 B2
(45) Date of Patent: Sep. 14, 2004

(54) HIGH ZOOM RATIO LENS

(75) Inventor: Yasuharu Yamada, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 0 days.

(21) Appl. No.: 10/184,927

(22) Filed: Jul. 1, 2002

(65) Prior Publication Data

US 2003/0156333 A1 Aug. 21, 2003

(30) Foreign Application Priority Data

Feb. 20, 2002 (JP) ........................................ 2002-043151

(51) Int. Cl.[7] .............................................. G02B 15/14
(52) U.S. Cl. ..................................... 359/687; 359/684
(58) Field of Search ................................ 359/687, 684, 359/683, 676

(56) References Cited

U.S. PATENT DOCUMENTS

| 5,859,729 A | * | 1/1999 | Misaka | ........................ 359/686 |
| 2001/0015856 A1 | * | 8/2001 | Yoneyama | ................... 359/687 |
| 2001/0022696 A1 | * | 9/2001 | Nishio | ......................... 359/687 |

FOREIGN PATENT DOCUMENTS

| JP | 04140704 A | 5/1992 | ........... G02B/15/20 |
| JP | 06075167 A | 3/1994 | ........... G02B/15/20 |
| JP | 06337354 A | 12/1994 | ........... G02B/15/20 |
| JP | 07113957 A | 5/1995 | ........... G02B/15/20 |
| JP | 08086963 A | 4/1996 | ........... G02B/15/20 |
| JP | 09184982 A | 7/1997 | ........... G02B/15/20 |
| JP | 11142740 A | 5/1999 | ........... G02B/15/20 |
| JP | 11-352400 | 12/1999 | ........... G02B/15/20 |
| JP | 2000-321497 A | 11/2000 | ........... G02B/15/20 |
| JP | 2000-330016 | 11/2000 | ........... G02B/15/00 |
| JP | 2000-338401 A | 12/2000 | ........... G02B/15/20 |
| JP | 2001-117005 | 4/2001 | ........... G02B/15/20 |
| JP | 2001147371 A | 5/2001 | ........... G02B/15/20 |

* cited by examiner

Primary Examiner—Jordan M. Schwartz
(74) Attorney, Agent, or Firm—Jacobson Holman PLLC

(57) ABSTRACT

The invention is dedicated to a compact and lightweight high zoom ratio lens which is configured in 4 lens group zoom system with a deployment of positive, negative, positive, and positive refraction lens groups in order, being approximately 75 degree in shooting angle of view at a wide-angle end, approximately f/3 to 4 at the wide-angle end, and approximately f/6 to 7 at a telephoto end so as to implement an enhanced variable zoom power up to approximately 10. The zoom lens includes first to fourth lens groups each comprised of a plurality of lenses, the lens groups having respective refractive indices of positive, negative, positive, and positive levels in order from the closest to an object. In zooming from a wide-angle end to a telephoto end, the first and second lens groups have a space (air-filled) widened therebetween, the second and third lens groups have a space (air-filled) narrowed therebetween, and the third and fourth lens groups have space (air-filled) narrowed therebetween while the first, third, and fourth lens groups move toward the object, and in focusing, the second lens group alone move, under predetermined conditions.

3 Claims, 4 Drawing Sheets

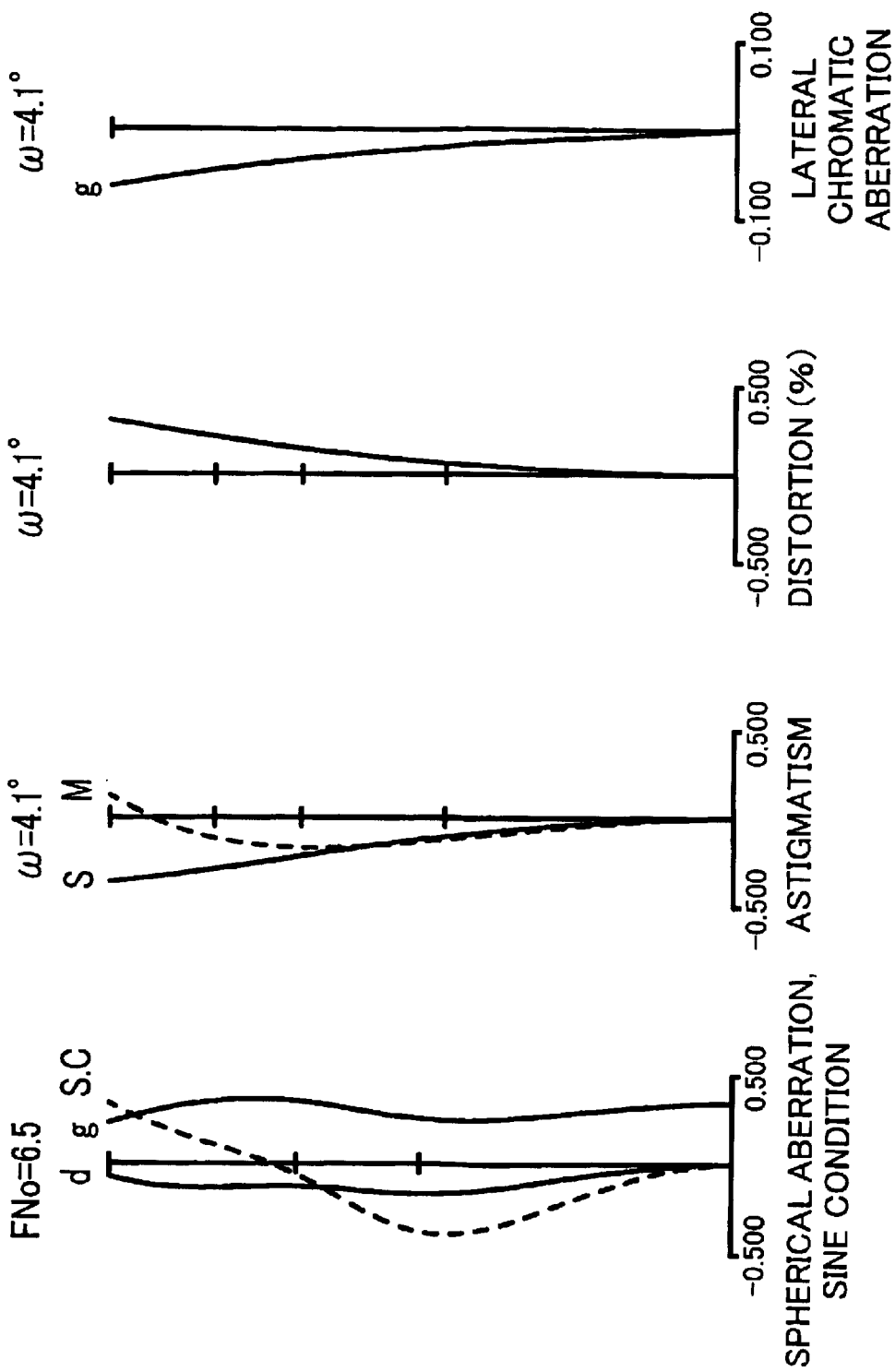

HIGH ZOOM RATIO LENS

FIELD OF THE INVENTION

The present invention relates to a high zoom ratio lens, and more particularly, it relates to a compact and lightweight high zoom ratio lens that is approximately 75 degrees in shooting angle of view at a wide-angle end, approximately f/3 to f/4 in F-number at the wide-angle end, approximately f/6 to f/7 at a telephoto end, and approximately 10 in zoom ratio, and that is suitable for a single-lens reflex camera, a video camera, an electronic still camera, and the like.

BACKGROUND ART

In the prior art, there have been proposed a variety of zoom lenses such as high zoom ratio having 4, 5 and 6 lens groups. Such highly multi-lens groups are advantageous in view of correcting aberrations, but they tend to lead to adverse effects of cost increase due to an increased number of components including a cam barrel and of resultantly making the whole lens larger. Instead, reduced lens groups such as a 2 lens groups encounter difficulty in attaining both enhancing a zoom ratio and downsizing because of a significantly reduced number of parameters.

As to an improvement of a high zoom ratio lens of emphatically down-sized and weight-reduced design, a 4 lens group zoom lens is suitably implemented, with four of the lens groups having their respective refractive power of positive, negative, positive, and positive levels in order from the closest to an object, which is equivalent to those disclosed in Japanese Patent Laid-Open No. 2000-330016 and Japanese Patent Laid-Open No. 2001-117005, and is also equivalent to Zoom Lens 185D (28 to 300 in focal length and f/3.5 to f/6.3) available from Tamron Incorporated.

Although a trend of down-sizing the high zoom ratio lenses has been drastic and rapid in recent years, improvements in the prior art are still yet bulky and heavy for practical use, compared with ordinary standard zoom lenses of approximately $\phi$62 mm in diameter of a filter in front of the high zoom ratio lens and roughly 3.5 in zoom ratio. In addition to that, insufficiently reduced dimensions of the prior art high zoom ratio lenses cause not only imbalance with more greatly down-sized and weight-reduced bodies of single-lens reflex cameras but also aesthetically unsatisfied appearance and poor portability.

One of factors of the high zoom ratio lenses staying larger than the standard zoom lenses is that displacement of each lens group is increased to attain higher zoom ratio. Additionally, associated variation in aberration is also increased, which, in turn, causes a difficulty in correcting the aberration throughout the focal range. To overcome such a disadvantage, several approaches have been attempted, including ways of reducing a refractive power of each lens group to correct aberration, increasing the number of lenses in each lens group to correct aberration without reducing the refractive power of the lens group, configuring aspherical surface to correct aberration, and so forth.

However, the ways other than that of using an aspheric geometry unavoidably make the whole lens dimensions larger. As with the way of using the aspheric geometry, however, simply increasing the number of aspherical surfaces causes further problems of a performance degradation due to a poor surface precision and of an increase in cost for a metal mold. For instance, the previously mentioned Zoom Lens 185D is comprised of 15 pieces of lenses, creating 3 of the aspherical surfaces, and this model is 93.6 mm in full lens length at a wide-angle end and $\phi$72 mm in filter diameter. Thus, in contrast with the standard zoom lenses (focal length 28 to 105, zoom ratio 3.75, f/3.5 to f/4.5), this type of zoom lens is 18 mm or more longer in the entire length of optics and 10 mm or more larger in filter effective diameter.

The zoom lenses as disclosed in Japanese Patent Laid-Open Nos. 2000-330016 and 2001-117005, when compared with the model 185D, are almost the same in effective diameter of the filter despite having some variation in the entire lens length of the optics at a wide-angle end. Thus, similar to the model 185, these lenses disclosed in Japanese Patent Laid-Open Nos. 2000-330016 and 2001-117005 are longer in the entire length of their respective optics and 10 mm or more larger in effective diameter of their filters, in comparison with the standard zoom lenses.

The present invention is made, allowing for the above mentioned disadvantages in the prior art high zoom ratio lenses, and accordingly, it is an object of the present invention to provide a compact and lightweight high zoom ratio lens which is configured in 4 lens group zoom format with a deployment of positive, negative, positive, and positive refractive power in order, being approximately 75 degree in shooting angle of view at the wide-angle end, approximately f/3 to f/4 at the wide-angle end, and approximately f/6 to f/7 at the telephoto end so as to implement an enhanced variable zoom power up to approximately 10, which is yet as large as the above-mentioned ordinary standard zoom lenses ($\phi$62 mm in diameters of their filters proximal to an object).

SUMMARY OF THE INVENTION

A zoom lens according to the present invention includes first to fourth lens groups each comprised of a plurality of lenses, the lens groups having respective refractive powers of positive, negative, positive, and positive levels in order from the closest to an object. In zooming from the wide-angle end to a telephoto end, the first and second lens groups have a an air-filled space widened therebetween, the second and third lens groups have an air-filled space narrowed therebetween, and the third and fourth lense groups have an air-filled space narrowed therebetween while the first, third, and fourth lens groups move toward the object, and in focusing, the second lens group alone moves, under the conditions described as follows:

$$0.05 < |f2|/(fT-fW) < 0.07 \quad (1)$$

$$0.3 < f1/(fT-fW) < 0.5 \quad (2)$$

$$0.2 < f4/(fT-fW) < 0.3 \quad (3)$$

$$0.37 < Z2/Z < 0.47 \quad (4)$$

where fW is a focal length of the entire optics at a wide-angle end, fT is a focal length of the entire optics at a telephoto end, f2 is a focal length of the second lens group, f1 is a focal length of the first lens group, f4 is a focal length of the fourth lens group, Z2 is equal to B2T/B2W, where B2W is an imaging magnification of the second lens group at the wide-angle end with B2W<0), B2T is an imaging magnification of the second lens group at the telephoto end with B2T<0, and Z is equal to fT/fW.

Another aspect of the present invention, as defined in claim 1, is characterized by additional conditions as in the following (A) to (D):

(A) In zooming or focusing, a condition is satisfied as follows:

$$2.7 < (TLW - 0.5 \times FLT / \tan \alpha \ W)/fW < 3.3 \quad (5)$$

where TLW is the full length of the entire optics (from a vertex of a foremost lens to an image plane) at the wide-angle end, FLT is an aperture of a filter located proximal to an object, and a W is a half angle of view.

(B) In zooming or focusing, a condition is satisfied as follows:

$$-0.1 < 1/\beta 3w < 0 < 1/\beta 3T < 0.3 \tag{6}$$

where $\beta 3w$ is an imaging magnification of the third lens at the wide-angle end, and $\beta 3T$ is an imaging magnification of the third lens group at the telephoto end.

(C) In zooming or focusing, a condition is satisfied as follows:

$$DWENP < 28 \tag{7}$$

where DWENP is a distance from a vertex of a surface of the first lens group closest to an object to the center of an entrance pupil.

(D) In zooming or focusing, conditions are satisfied as follows:

$$0.15 < |\beta 2W| < 0.3 \tag{8}$$

$$e0 < 5 \tag{9}$$

$$h1 + e0 \times \tan \alpha W + fW/(2 \times FW) < 25 \tag{10}$$

where e0 is a distance from a vertex of a foremost surface of the first lens group closest to an object to a frontal principal point of the first lens group, and h1 is a height at which extensions of chief rays incident at a half angle of view upon the wide-angle end transversely pass a frontal principal plane of the first lens group, satisfying a paraxial condition as expressed in an equation of $h1 = e1 \times e2 \times \tan \alpha W \times (1/e1 + 1/e2 - \phi 2)/((1 - e1 \times \phi 1) \times (1 - e2 \times \phi 2) - e2 \times \phi 1)$ where $\phi 1$ is a refractive power of the first lens group, $\phi 2$ is a refractive power of the second lens group, e1 is a distance between principal points of the first and second lens groups, as expressed in an equation of $e1 = (\phi 1 + \phi 2 - \phi 1/\beta 2W)/(\phi 1 \times \phi 2)$, and e2 is a distance between a principal point of the second lens group and that of aperture stop, as expressed in an equation of $e2 = (1 - hSTP \times 2 \times FW/fW - \phi 1 \times e1) \times \beta 2W/\phi 1$ where hSTP is an opening radius of the aperture stop, and FW is a F-number at the wide-angle end.

The present invention uses an inner focusing system where only the second lens group is moved for focusing. Such an inner focusing system is disadvantageous in that the focusing is associated with considerably large variations in focal length. However, since there is no necessity of moving relatively large and heavy lenses like those of the first lens group, a reduced load is imposed on a driving motor during automatic focusing to enable quick focus adjustment, and since an effective aperture of the foremost lens of the first group can be retained relatively small on focusing in the closest object, this method offers practical merits that facilitates downsizing.

DESCRIPTION ON THE FORMULAE

The conditional formula (1) gives a definition a rate of a difference between focal lengths fT and fW of the entire optics at the telephoto end and the wide-angle end of the zoom lens, to a focal length f2 of the second lens group. Above the upper limit of the conditional formula (1), the focal length of the second lens group becomes longer, and this results in an increased displacement of the lenses on zooming in or out, which leads to an adverse effect upon downsizing of the zoom lens. Below the lower limit defined by the conditional formula (1), the focal length of the second lens group becomes shorter, and this causes a difficulty in correcting various aberrations.

The conditional formula (2) defines a rate of a difference between focal lengths fT and fW of the entire optics at the telephoto end and the wide-angle ends of the zoom lens, to a focal length f1 of the first lens group. Above the upper limit defined by the conditional formula (2), the focal length of the first lens group becomes longer, and this brings about an advantageous effect on correction of various aberrations but causes an adversely increased displacement of the lenses on zooming in or out, which leads to a necessity of increase in the entire length of the zoom lens. Below the lower limit of the conditional formula (2), the focal length of the first lens group becomes shorter, and this causes a difficulty in correcting various aberrations.

The conditional formula (3) gives a definition of a rate of a difference between focal lengths fT and fW of the entire optics at the telephoto end and the wide-angle end of the zoom lens, to a focal length f4 of the fourth lens group. Above the upper limit defined by the conditional formula (3), the focal length of the fourth lens group becomes longer, and this brings about an advantageous effect on correction of various aberrations but causes an adversely increased back-focus and a resultant increase in the entire length of the zoom lens, which leads to a disadvantageous effect on downsizing. Below the lower limit of the conditional formula (3), the focal length of the fourth lens group becomes shorter, and this causes a decrease in back-focus, which leads to a difficulty in reserving a mirror displacing range of a single-lens reflex camera. This also results in correction of various aberrations being difficult.

The conditional formula (4) gives a definition of a rate of a variable zoom ratio for shifting the entire optics from the wide-angle end to the telephoto end, to a zoom ratio for shifting the second lens group from the wide-angle end to the telephoto end. Above the upper limit of the conditional formula (4), the zoom ratio imposed on the second lens group on the zooming is raised, and without enhancement of refractive power of the second lens group, a displacement of the second lens group is increased, which causes an adverse effect on downsizing of the zoom lens. Instead, with an enhancement of the refractive power of the second lens group, variations in aberrations are increased to make corrections difficult. Below the lower limit of the conditional formula (4), variable zoom ratios imposed on some lens groups like the third and fourth lens group other than the second lens group are raised, and without enhancement of the refractive power of those lens group, their respective displacements are increased, which leads to an adverse effect on downsizing. On the contrary, with enhancement of the refractive power of those lens groups, variations in aberrations are increased to make corrections difficult.

The conditional formula (5) defines a relation among the entire length from the foremost lens to the image plane of the entire optics at the wide-angle end, a half angle of view and a focal length of the same at the wide-angle end, and an aperture of a filter proximal to an objective lens. Above the upper limit of the conditional formula (5), since the entire length is too long relative to the effective aperture of the foremost lens in accord with a specific aperture of the filter proximal to the objective lens, an amount of rays on periphery of a image is insufficient at the wide-angle end, and an increase in the apertures of the first and last lenses causes an adverse effect on downsizing. An attempt to enhance the refractive power of the first lens group to ensure a sufficient amount of peripheral rays causes a difficulty in correcting various aberrations. Below the lower limit of the conditional formula (5), since the entire length is too short relative to the effective aperture of the foremost lens, each of the lens groups must be excessively increased in power or decreased in lens thickness and in width of air-filled space, which leads to difficulties in correcting aberrations and in machining related components.

The conditional formula (6) defines a relation between imaging magnification of the third lens group at the wide-angle end and the telephoto end. Above the upper limit as defined by the conditional formula (6) or below the lower limit, since paraxial rays, which are exited from the third lens group, fall upon the fourth lens group at increased incident angles at both the wide-angle end and the telephoto end, a variation in a spherical aberration caused in the fourth lens group is increased, and this leads to a difficulty in correction of the aberration. Defining the imaging magnification as being in a range as in the conditional formula (6), with a centered zero level incremented and decremented by both positive and negative predetermined values, axial rays incident upon the fourth lens group turn to be rays approximately parallel to the optical axis (afocal rays) throughout the zoom range, and this is useful for enabling the variation of the spherical aberration to be reduced when the fourth lens group moves along to the optical axis (i.e., in a thrust direction).

The conditional formula (7) gives a definition of a distance from a vertex of a surface of the first lens group facing to an object to the center of the entrance pupil at the wide-angle end. Above the upper limit defined by the conditional formula (7), the effective aperture of the foremost lens as wide as that of the standard zoom lens (an aperture of a filter proximal to an objective lens is $\phi62$ mm) leads to an insufficient amount of rays on periphery of a image at the wide-angle end, and therefore, the effective aperture of the foremost lens or the rearmost lens must be widened, which adversely effects on downsizing of the zoom lens.

The conditional formula (8) defines imaging magnification of the second lens group at the wide-angle end. Above the upper limit defined by the conditional formula (8), since a displacement of the second lens group is increased on focusing at the wide-angle end, accordingly those lenses become close to the first lens group on focusing in the nearest object so that an idle room besides the displacement is hard to retain. If, in order to avoid such undesired situation, the air-filled space between the first and second lens groups is widened, the entire length of the zoom lens and the effective aperture of the foremost lens are increased, which leads to an adverse effect on downsizing the zoom lens. Below the lower limit of the conditional formula (8), since incident angles of paraxial rays falling from the second lens group upon the third lens group at the wide-angle end are increased, a variation of a spherical aberration caused in the third lens group is accordingly increased on the focusing, and this causes a difficulty in correcting the aberration.

The conditional formula (9) gives a definition of a distance from a vertex of a surface of the first lens group proximal to an object to a frontal principal point of the same. Above the upper limit of the conditional formula (9), rays around the periphery of a view pass apart from the center of the stop at the wide-angle end, and this is apt to cause shading at the minimum aperture of the stop. The rays can avoid shading even under the condition that they are transmitted through the aperture of the foremost lens as wide as that of the standard zoom lens and can pass through the center of the aperture stop, by diminishing the refractive power of the first lens group, raising the refractive power of the second lens group, and/or, shortening a width between the principal points of both the lens groups. However, in either way, it is hard to implement the paraxial system capable of attaining satisfactory performance of a high zoom ratio lens that is compact and enables a zooming-in feature, which is the object and goal of the present invention.

The conditional formula (10) expresses a definition of the maximum height (a radius of an effective aperture of the foremost lens at the wide-angle end computed based upon paraxial data) from the optical axis at which the peripheral rays around the view at the wide-angle end pass through a plane contiguous to the vertex of a surface of the first lens group proximal to an object without vignetting. Above the upper limit of the conditional formula (10), the effective aperture of the foremost lens is increased, and this causes a difficulty in accomplishing a downsized and lightweight high zoom ratio lens as compact as the above-mentioned standard zoom lenses (having an aperture of the filter proximal to an object of $\phi62$ mm), which is the object and goal of the present invention.

BRIEF DESCRIPTION OF THE DRAWINGS

The present invention will be best taken in conjunction with the accompanying drawings where:

FIG. 4 is a diagram illustrating various aberrations at a telephoto end of the preferred embodiment of the high zoom ratio lens.

DETAILED DESCRIPTION OF THE PREFERRED EMBODIMENTS

Figure 1:
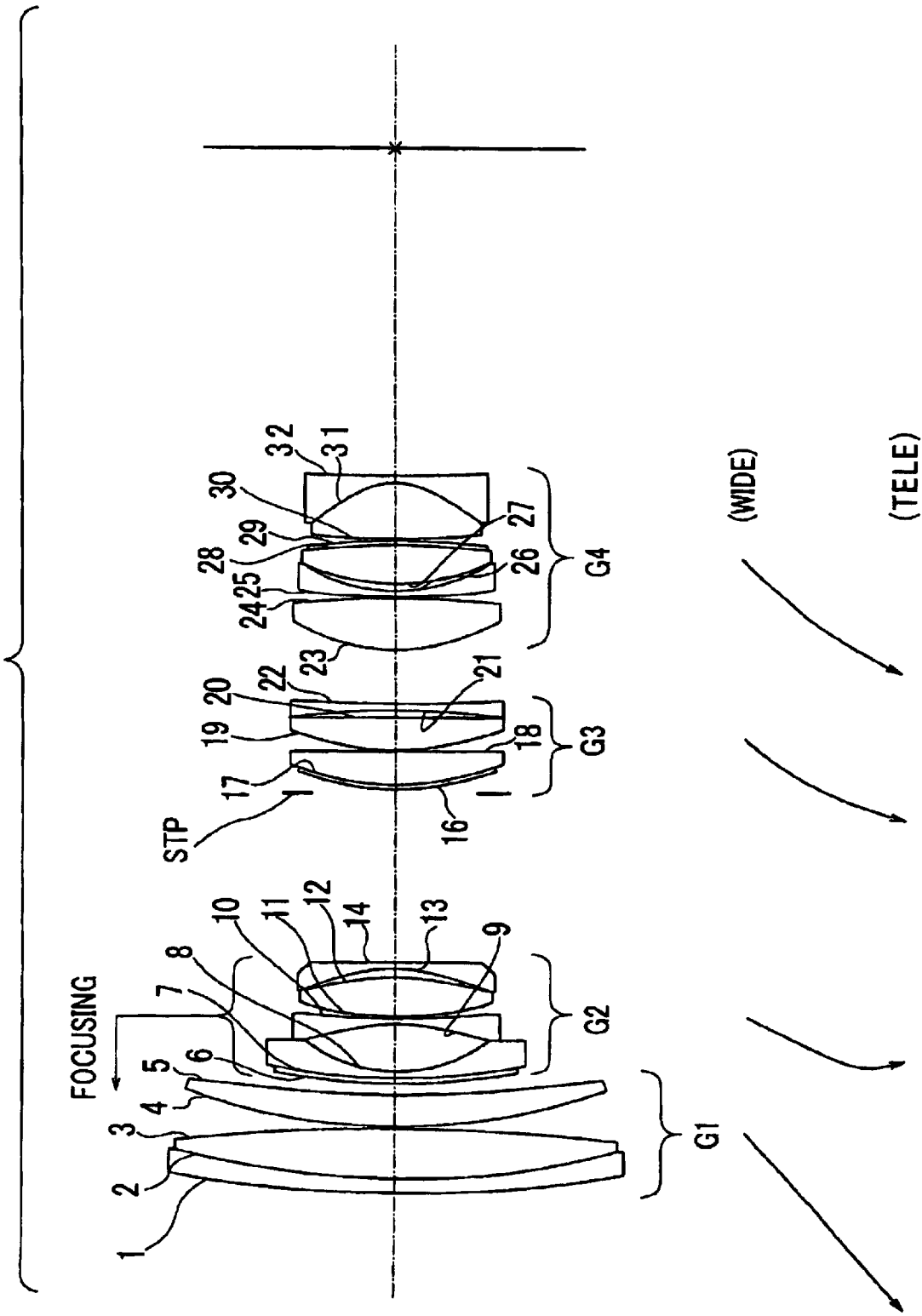
FIG. 1 is a diagram illustrating an optical system of a preferred embodiment of a high zoom ratio lens.
Figure 2:
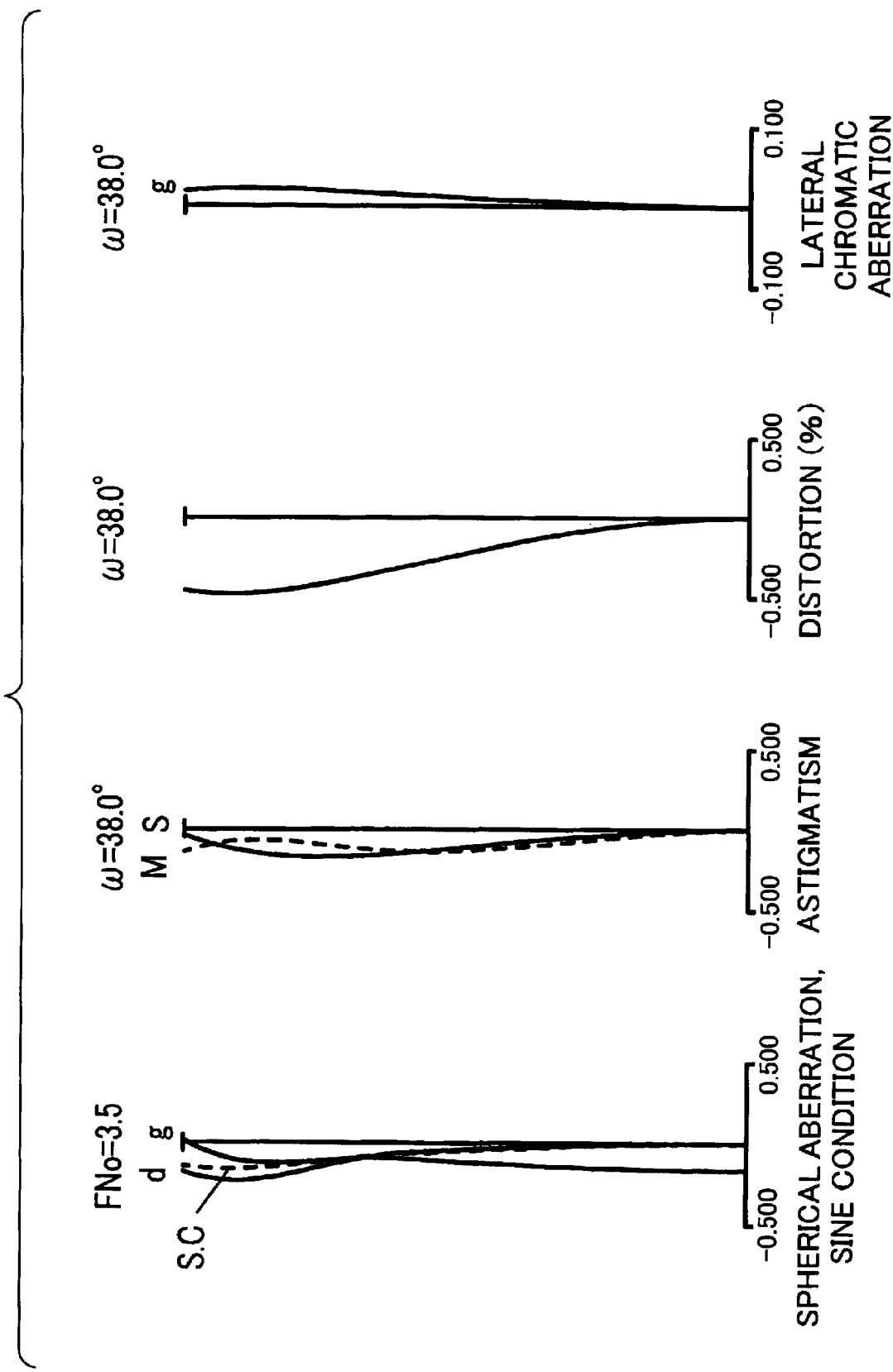
FIG. 2 is a diagram illustrating various aberrations at a wide-angle end of the preferred embodiment of the high zoom ratio lens.
Figure 3:
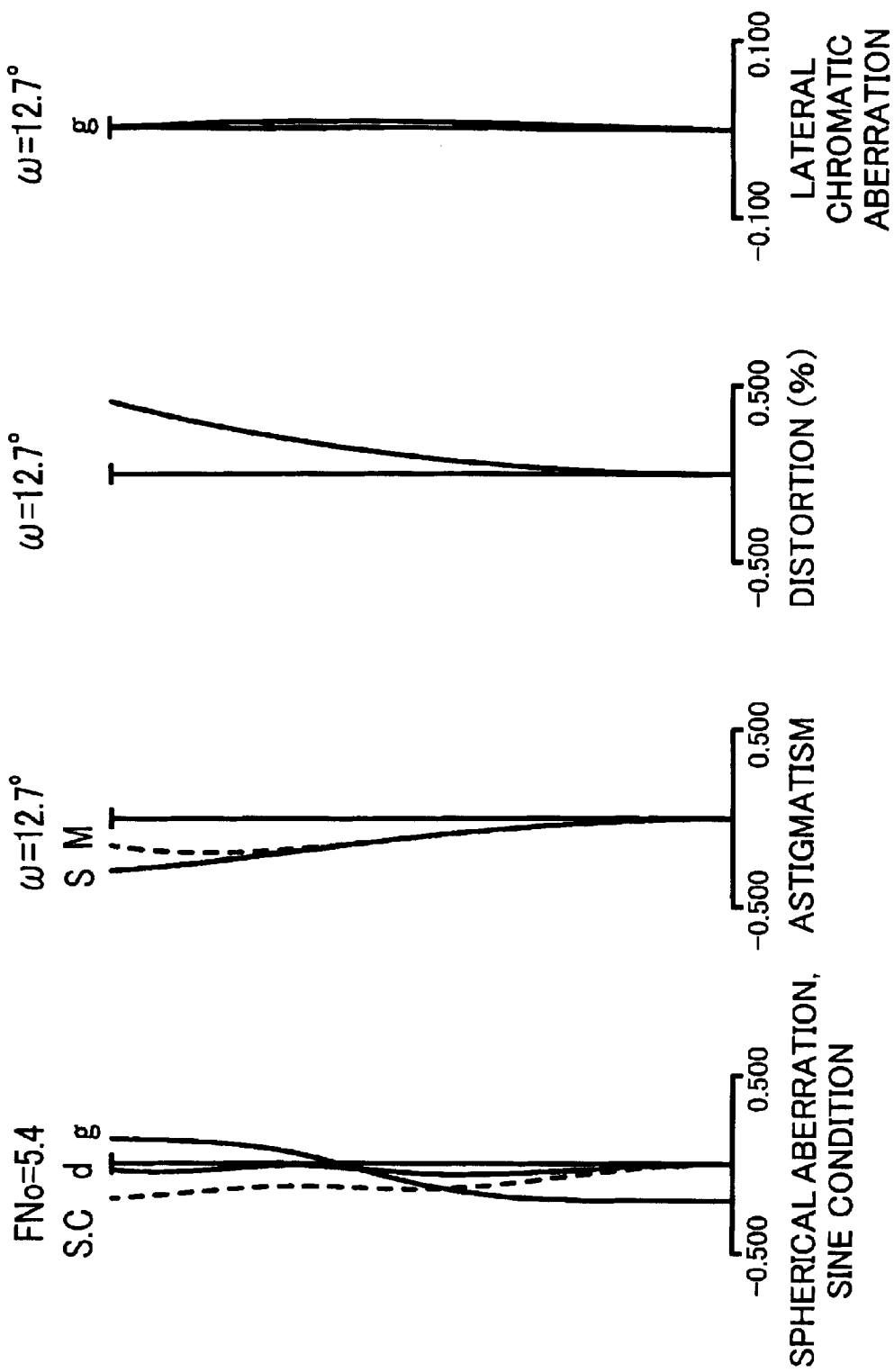
FIG. 3 is a diagram illustrating various aberrations at an intermediate focal length of the preferred embodiment of the high zoom ratio lens.

A preferred embodiment of a high zoom ratio lens according to the present invention will be described. FIG. 1 depicts an optical system of the preferred embodiment of the high zoom ratio lens. In FIG. 1, G1 denotes a first lens group exhibiting positive refractive power, G2 denotes a second lens group exhibiting negative refractive power, G3 denotes a third lens group exhibiting positive refractive power, G4 denotes a fourth lens group exhibiting positive refractive power, and STP designates an aperture stop. FIG. 2 illustrates various aberrations at a wide-angle end of the preferred embodiment of the high zoom ratio lens. FIG. 3 illustrates various aberrations in a situation of an intermediate focal length of the preferred embodiment of the high zoom ratio lens. FIG. 4 illustrates various aberrations at a telephoto end of the preferred embodiment of the high zoom ratio lens.

A configuration of the high zoom ratio lens will now be described. f denotes a focal length, Fno is a F-number, # denotes the number of a specific surface, r is a radius of curvature of a lens surface, d designates a lens thickness or a width of air-filled space, and, n and v are a refractive index and Abbe constant of d-ray ($\lambda=587.6$ nm). In Table 1 below providing optical data on the high zoom ratio lens, surfaces with asterisk (*) prefixed to their reference number are aspherical in shape.

A formula expressing a shape of an aspherical surface is given as follows, assuming that H is a vertical height to the optical axis, X(H) is a displacement of the height in a direction of the optical axis in the coordinates having the original point of a vertex of the surface, R is a paraxial radius of curvature, $\epsilon$ is a constant of the cone, and, An is an aspherical coefficient in the order of n:

$$X(H)=(H^2/R)/\{1+[1-(1+\epsilon)*(H^2/R^2)]^{1/2}\}+A4H^4+A6H^6+A8H^8+A10H^{10} \quad (11)$$

(Optical Performance)

f=29.00~92.21~289.53

Fno=3.50~5.37~6.50

TABLE 1

| # | r | d | n | ν |
|---|---|---|---|---|
| 1 | 178.94 | 1.5 | 1.84666 | 23.8 |
| 2 | 80.58 | 6.5 | 1.49700 | 81.6 |
| 3 | −246.99 | 0.2 | | |
| 4 | 60.84 | 4.0 | 1.77250 | 49.6 |
| 5 | 157.24 | d5 = 1.698~32.301~57.566 | | |
| *6 | 112.15 | 0.2 | 1.53610 | 41.2 |
| 7 | 68.35 | 0.8 | 1.83481 | 42.7 |
| 8 | 15.90 | 5.8 | | |
| 9 | −31.95 | 0.8 | 1.69680 | 55.5 |
| 10 | 89.30 | 0.1 | | |
| 11 | 32.92 | 4.8 | 1.84666 | 23.8 |
| 12 | −32.92 | 0.8 | | |
| 13 | −22.39 | 0.9 | 1.83481 | 42.7 |
| 14 | 475.95 | d14 = 20.845~10.646~0.991 | | |
| 15 | ∞ (Stop) | 0.9 | | |
| *16 | 30.74 | 0.2 | 1.53610 | 41.2 |
| 17 | 30.74 | 4.1 | 1.61800 | 63.4 |
| 18 | 1234.19 | 0.1 | | |
| 19 | 29.65 | 3.9 | 1.49700 | 81.6 |
| 20 | −4488.15 | 0.9 | | |
| 21 | −100.35 | 0.8 | 1.84666 | 23.8 |
| 22 | 128.33 | d22 = 6.685~2.574~1.117 | | |
| 23 | 19.39 | 6.2 | 1.48749 | 70.2 |
| 24 | −104.58 | 0.2 | | |
| 25 | 71.24 | 0.8 | 1.77250 | 49.6 |
| 26 | 16.56 | 0.8 | | |
| 27 | 20.87 | 5.0 | 1.51823 | 59.0 |
| 28 | −68.00 | 0.2 | 1.53610 | 41.2 |
| *29 | −68.00 | 0.2 | | |
| 30 | 66.30 | 7.2 | 1.54072 | 47.2 |
| 31 | −11.31 | 0.8 | 1.77250 | 49.6 |
| 32 | 101.58 | | | |

(Aspherical Coefficient)

r6

$\epsilon = 33.6256$
$A4 = 5.42142 \times 10^{-06}$
$A6 = 9.41353 \times 10^{-09}$
$A8 = -7.17372 \times 10^{-11}$
$A10 = 5.53524 \times 10^{-13}$ r16

$\epsilon = -2.1180$
$A4 = -2.13533 \times 10^{-07}$
$A6 = 4.22277 \times 10^{-10}$
$A8 = 1.10635 \times 10^{-10}$
$A10 = -8.53798 \times 10^{-13}$ r29

$\epsilon = 27.3693$
$A4 = 1.56165 \times 10^{-05}$
$A6 = -5.46433 \times 10^{-09}$
$A8 = 2.26112 \times 10^{-10}$
$A10 = -7.28883 \times 10^{-12}$ According to the present invention, the preferred embodiment of the high zoom ratio lens uses the following predetermined values for the conditional formulae:

$|f2|/(fT-fW)=0.058$ (1)

$f1/(fT-fW)=0.372$ (2)

$f4/(fT-fW)=0.265$ (3)

$Z2/Z=0.421$ (4)

$(TLW-0.5 \times FLT/\tan \alpha W)/fW 2.981$ (5)

$1/\beta 3w=-0.039$ $1/\beta 3T=0.192$ (6)

$DWENP=26.33$ (7)

$|\beta 2W|=0.206$ (8)

$e0<5=3.724$ (9)

$h1+e0 \times \tan \alpha W+fW/(2 \times FW)=23.89$ (10)

(Aberrations)

Spherical aberration, sine condition, astigmatism, distortion, lateral chromatic aberration at the wide-angle end (f=29.00) of the preferred embodiment of the high zoom ratio lens are as shown in FIG. 2.

Spherical aberration, sine condition, astigmatism, distortion, lateral chromatic aberration at the intermediate focal length (f=92.21)of the preferred embodiment of the high zoom ratio lens are as shown in FIG. 3.

Spherical aberration, sine condition, astigmatism, distortion, lateral chromatic aberration at the telephoto end (f=289.53) are as shown in FIG. 4.

The present invention effectively provides a compact and lightweight high zoom ratio lens which is configured in 4 lens group zoom system with a deployment of positive, negative, positive, and positive refraction lens groups in order from the closest to an object, being approximately 75 degree in shooting angle of view at a wide-angle end, approximately f/3 to 4 at the wide-angle end, and approximately f/6 to 7 at a telephoto end so as to implement an enhanced variable zoom power up to approximately 10, which is yet as large as standard zoom lenses (φ62 mm in aperture of their filters in front of the high zoom ratio lens).

Although the best mode of the present invention has been described, these and other objects, features, and advantages of the invention are simply examples and illustrations and not limited to the precise forms as described above, and any person having ordinary skills in the art would easily find modifications and variations of them. All the modifications and variations are intended to be included in the invention without departing from the true spirit and scope of the invention as defined in the appended claims.

What is claimed is:

1. A zoom lens, including first to fourth lens groups each comprised of a plurality of lenses, the lens groups having respective refractive powers of positive, negative, positive, and positive levels in order from the closest to an object, in zooming from a wide-angle end to a telephoto end, the first and second lens group having an air-filled space widened therebetween, the second and third lens groups having an air-filled space narrowed therebetween, and the third and fourth lens groups having an air-filled space narrowed therebetween while the first, third, and fourth lens groups move toward the object, and in focusing, the second lens group alone moving, under the conditions described as follows:

$0.05<|f2|/(fT-fW)<0.07$ (1)

$0.3<f1/(fT-fW)<0.5$ (2)

$0.2<f4/(fT-fW)<0.3$ (3)

$0.37<Z2/Z<0.47$ (4)

where fW is a focal length of the entire optics at a wide-angle end, fT is a focal length of the entire optics at a telephoto end, f2 is a focal length of the second lens group, f1 is a focal length of the first lens group, f4 is a focal length of the fourth lens group, Z2 is equal to $\beta 2T/\beta 2W$, where $\beta 2W$ is an imaging magnification of the second lens group at the wide-angle end with $\beta 2W<0$, $\beta 2T$ is an imaging magnification of the second lens group at the telephoto end with $\beta 2T<0$, and Z is equal to fT/fW, the conditions further including $$DWENP<28 \quad (7)$$

$$0.15<|\beta 2W|<0.3 \quad (8)$$

$$e0<5 \quad (9)$$

$$h1+e0\times\tan \alpha W+fW/(2\times FW)<25 \quad (10)$$

where DWENP is a distance from a vertex of a surface of the first lens group closest to an object to the center of an entrance pupil, where e0 is a distance from a vertex of a surface of the first lens group closest to an object to a frontal principal point of the first lens group, and h1 is a height at which extensions of chief rays incident at a half angle of view upon the wide-angle end transversely pass a frontal principal plane of the first lens group, satisfying a paraxial condition as expressed in an equation of $h1=e1\times e2\times\tan\alpha W\times(1/e1+1/e2-\phi 2)/((1-e1\times\phi 1)\times(1-e2\times\phi 2)-e2\times\phi 1)$ where $\phi 1$ is a refractive power of the first lens group, $\phi 2$ is a refractive power of the second lens group, e1 is a distance between principal points of the first and second lens groups, as expressed in an equation of $e1=(\phi 1+\phi 2-\phi 1/(\beta 2W))/(\phi 1\times\phi 2)$, and e2 is a distance between a principal point of the second lens group and that of aperture stop, as expressed in an equation of $e2=(1-hSTP\times 2\times FW/fW -\phi 1\times e1)\times\beta 2W/\phi 1$ where hSTP is an opening radius of the aperture stop, FW is a F-number at the wide-angle end and $\alpha W$ is a half angle of view.

2. A high zoom ratio lens according to claim 1, wherein the conditions further include $$2.7<(TLW-0.5\times FLT/\tan\alpha W)/fW<3.3 \quad (5)$$

where TLW is the full length of the entire optics from a foremost lens to an image plane at the wide-angle end, FLT is an aperture of a filter located proximal to an object, and.

3. A high zoom ratio lens according to claim 1, wherein the conditions further include $$-0.1<1/\beta 3w<0<1/\beta 3T<0.3 \quad (6)$$

where $\beta 3w$ is an imaging magnification of the third lens group at the wide-angle end, and $\beta 3T$ is an imaging magnification of the third lens group at the telephoto end.

* * * * *